United States Patent Office

3,093,451
Patented June 11, 1963

---

3,093,451
PROCESS FOR PREPARING SILICON ISOCYANATES
Guenter Karl Weisse, Hamden, and Robert M. Thomas, Orange, Conn., assignors to Olin Mathieson Chemical Corporation, a corporation of Virginia
No Drawing. Filed Jan. 26, 1961, Ser. No. 84,971
15 Claims. (Cl. 23—14)

The present invention relates to a process for the preparation of silicon isocyanates. More particularly the present invention resides in a process for the preparation of silicon isocyanates by the reaction between isocyanic acid and a silicon halide.

Silicon isocyanates are conventionally prepared by reacting silver isocyanate or an alkali metal cyanate with the corresponding silicon chloride. These methods are subject to numerous disadvantages. The silver isocyanate method is expensive, especially due to the high cost of the silver reactant. In addition the silver isocyanate method prepares the product in a heterogeneous reaction mixture which must be continually agitated during the reaction. The silver isocyanate method is subject to the further disadvantage that the reaction itself is quite slow and normally high reaction temperatures and long reaction times are required in order to obtain good yields. The alkali metal cyanate method is subject to the significant disadvantage of low yields, even where long reaction times are employed, unless a large excess of the expensive alkali metal cyanate is used.

It is, therefore, an object of the present invention to provide an improved process for the preparation of silicon isocyanates.

It is an additional object of this invention to prepare silicon isocyanates inexpensively and expeditiously.

It is a further object of the present invention to prepare silicon isocyanates utilizing a homogeneous reaction mixture which does not require continuous agitation during the reaction.

It is a particular object of the present invention to provide a process which will prepare silicon isocyanates in high yields, even at ambient reaction temperatures.

Further objects and advantages of the present invention will appear hereinafter.

The foregoing objects and advantages of the present invention are accomplished by the process of the present invention. The silicon isocyanates which are prepared have the following structural formula:

$$R_ySi(NCO)_z$$

wherein each R is independently selected from the group consisting of a monovalent hydrocarbon radical, a monovalent alkoxy radical, and a monovalent aryloxy radical, $y$ is an integer from 0 to 3, inclusive, $z$ is an integer from 1 to 4, inclusive, and the sum of $y$ plus $z$ is equal to four. The process of the present invention comprises reacting together in the liquid phase, at a temperature of between −85 and 150° C., isocyanic acid and a silicon halide having the structural formula:

$$R_ySiX_z$$

wherein X is halogen and R, $y$, and $z$ are as defined above, in the presence of a nitrogen-containing compound selected from the group consisting of compounds having the following structural formulas and mixtures thereof:

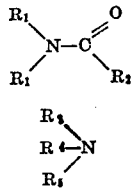

wherein each $R_1$ is independently a monovalent hydrocarbon radical, and $R_2$ is selected from the group consisting of a monovalent hydrocarbon radical and hydrogen, and each $R_3$, $R_4$ and $R_5$ is independently selected from the group consisting of a monovalent hydrocarbon radical and hydrogen, at least one, but not more than two, of $R_3$, $R_4$ and $R_5$ being a monovalent aromatic radical, and not more than one of $R_3$, $R_4$ and $R_5$ being hydrogen, and recovering the resulting product. The findings of the present invention are unexpected and surprising, especially in view of the teaching of H. S. Anderson, Journal of the American Chemical Society 72, 193, who shows that isocyanic acid is inert to silicon tetrachloride when they are the sole reactants. In addition, Goubeau et al., Ber. 93, 1111 through 1116, show that no methylsilicon isocyanate can be prepared from free isocyanic acid and methylsilicon halides.

Isocyanic acid, frequently referred to in the art as cyanic acid, is known in the art and may be prepared by conventional procedures, such as by pyrolysis of cyanuric acid and condensation of the vapors.

The silicon halides which may be employed are those which have the structural formula:

$$R_ySiX_z$$

wherein R, X, $y$ and $z$ are as defined above. Each of the R radicals should preferably, although not essentially, contain less than seven carbon atoms since the compounds containing these radicals are more readily available and have been found to be the most useful. The R radicals may be the same or different. Illustrative hydrocarbon, alkoxy, and aryloxy radicals are as follows: alkyl radicals, such as methyl, ethyl, propyl, isopropyl, butyl, hexyl, octyl, decyl, dodecyl, etc.; alkenyl radicals, such as ethenyl, propenyl, etc.; alkynyl radicals, such as ethynyl, propynyl, etc.; cycloalkyl radicals, such as cyclopropyl, cyclobutyl, cycloamyl, cyclohexyl, etc.; cycloalkenyl radicals, such as cyclobutenyl, cyclopentenyl, cyclohexenyl, etc.; aryl radicals, such as phenyl, anthracyl, naphthyl, etc.; aralkyl radicals, such as benzyl, phenylethyl, phenyl-propyl, etc.; alkaryl radicals, such as xylyl, tolyl, ethylphenyl, p-butylphenyl, p-diisobutyl phenyl, etc.; alkoxy radicals, such as methoxy, ethoxy, propoxy, etc.; and aryloxy radicals, such as phenoxy, p-butyl-phenoxy, etc. In addition the hydrocarbon, alkoxy or aryloxy group may be substituted with non-interfering substituents, such as halo (i.e., chloro, bromo, fluoro or iodo), nitro, sulfo, etc. The X substituent in the silicon halide is any halogen or mixtures thereof, with the preferred being chlorine.

Exemplificative silicon halides include, but are not limited to, the following compounds: silicon tetrachloride;

silicon tetrabromide; silicon tetrafluoride; silicon tetraiodide; methyltrichlorosilane; dimethyldichlorosilane; trimethylchlorosilane; diethyldichlorosilane; di-n-butyl-dichlorosilane; diphenyldichlorosilane; phenyltrichlorosilane; ethyl phenyldichlorosilane; diethoxydichlorosilane; diphenoxydichlorosilane; methyl ethyldichlorosilane; methylpropyldichlorosilane; etc.

Isocyanic acid and the desired silicon halide are reacted together in the presence of the nitrogen-containing compound. The nitrogen-containing compound acts as an acceptor for the hydrogen halide evolved by the reaction between isocyanic acid and the silicon halide, and preferably, but not necessarily, forms an insoluble compound by reaction with the hydrogen halide. The insoluble compound precipitates from the reaction mixture and may be readily separated by numerous methods known in the art, for example, by filtration. The product may then be recovered from the filtrate by any convenient means, for example, fractional distillation or crystallization.

The nitrogen-containing compounds which may be employed in the process of the present invention are tertiary amides and tertiary amines. One or more amide or amine or mixtures thereof may be conveniently employed. The compounds which may be utilized are tertiary amides having the structural formula:

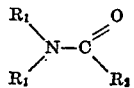

and tertiary amines having the structural formula:

wherein $R_1$, $R_2$, $R_3$, $R_4$ and $R_5$ are as defined above. Each of the radicals $R_1$, $R_2$, $R_3$, $R_4$ and $R_5$ should preferably, although not essentially, contain less than seven carbon atoms, since the compounds containing these radicals are the most readily available and have been found to give the best results; however, good results are obtainable when one or more of the radicals $R_1$, $R_2$, $R_3$, $R_4$ and $R_5$ contain seven carbon atoms or greater. The $R_1$ radicals may be the same or different. Illustrative hydrocarbon radicals representing $R_1$, $R_2$, $R_3$, $R_4$ and $R_5$ are those listed above, i.e., alkyl radicals, alkenyl radicals, alkynyl radicals, cycloalkyl radicals, cycloalkenyl radicals, aryl radicals, aralkyl radicals, and alkaryl radicals, and illustrative radicals listed thereunder. In addition the hydrocarbon radicals may be substituted with non-interfering substituents, such as an ester group or a nitro group.

The nitrogen-containing compounds which are employed must be substantially non-reactive under the conditions of the reaction, except for the reaction with the hydrogen halide. In addition they should preferably form a homogeneous reaction mixture with reactants and reaction products.

Exemplificative nitrogen-containing compounds include, but are not limited to, the following compounds: dimethyl acetamide; dimethyl formamide; diethyl acetamide; methyl ethyl acetamide; dimethyl butyramide; methyl phenyl acetamide; ethyl phenyl acetamide; methyl ethenyl acetamide; methyl benzyl acetamide; diphenyl amine; dimethyl aniline; diethyl aniline; methyl ethyl aniline; methyl phenyl aniline; ethyl phenyl aniline; phenyl naphthyl amine; etc. The preferred nitrogen-containing compounds are the lower alkyl and phenyl substituted compounds. Especially preferred are dimethyl acetamide, diphenyl amine and dimethyl aniline.

The silicon isocyanates, which are the products of the process of the present invention, have the following structural formula:

wherein R, $y$, and $z$ are as defined above. Representative radicals for the substituent R are those listed above. The R radicals may be the same or different. Typical products include, but are not limited to, the following: tetraisocyanatosilane; dimethyldiisocyanatosilane; di-n-butyl - diisocyanatosilane; chlorotriisocyanatosilane; diethoxy - diisocyanatosilane; di($\beta$ - chloroethoxy) - diisocyanatosilane; dimethoxy - diisocyanatosilane; diphenoxy - diisocyanatosilane; phenyl - triisocyanatosilane; diphenyl - diisocyanatosilane; 2,4 - dichlorophenyl-triisocyanatosilane; 2,4 - dinitrophenyl - triisocyanatosilane; triphenyl - isocyanatosilane; methyl ethyl diisocyanatosilane; methyl propyl diisocyanatosilane; etc.

The time of reaction is not critical and extended reaction times may be used, if desired. Generally, however, reaction times of up to about four hours are employed. The reaction is conducted between $(-)85$ and $150°$ C., and preferably between 20 and $80°$ C., it being understood that the reaction goes faster at higher temperatures. It is an advantage of the present invention that high yields are obtained at ambient temperatures and short reaction cycles. Naturally, wide variations in either may be tolerated.

The ratio of isocyanic acid to silicon halide is not critical. Generally, however, the theoretical proportions, or an excess of silicon halide, are employed. It should be understood that molar ratios are calculated on complete displacement of halogen, e.g., one mole of $SiX_4$ requires four moles of isocyanic acid and four moles of nitrogen-containing compound. The excess of silicon halide is desirable as it acts as a stabilizer for the isocyanic acid and isocyanate product. An excess of isocyanic acid may also be used, but may result in the formation of undesirable by-products.

The amount of nitrogen-containing compound may be varied within a wide range. Generally from 0.5 to 3.0 moles of nitrogen-containing compound per mole of isocyanic acid may be employed, and preferably from 0.8 to 1.5 moles.

Either a crude or purified isocyanic acid may be used. It is especially advantageous to introduce into the reaction mixture crude, gaseous isocyanic acid directly from the pyrolysis of cyanuric acid. Alternatively, prior to introduction of the gaseous isocyanic acid, the gas may be absorbed in an inert solvent or in one of the reactants, for example, preferably the silicon halide.

The order of addition of the reactants is not critical, except that in some instances it is desirable to avoid direct contact between the nitrogen-containing compound and isocyanic acid as a highly exothermic reaction might result. It is preferred but not essential either to add the nitrogen-containing compound slowly to a mixture of isocyanic acid and the silicon halide, or to add the isocyanic acid slowly to a mixture of nitrogen-containing compound and silicon halide. It is especially preferred to add the crude gas slowly.

If desired, the reaction may be conducted in the presence of a solvent which is substantially inert with respect to reactants and reaction products. Typical solvents which may be employed include, for example, diethyl ether, benzene, toluene, xylene, petroleum ether, etc. In addition, it is desirable, but not essential, to wash the precipitated hydrochloride which has been removed from the reaction mixture with any of the above solvents in order to free any occluded filtrate.

The products of the process of the present invention may be used in a wide variety of applications, for example, they are useful for imparting water repellency to textiles and in the preparation of sealants and coatings. They are also useful in the preparation of polymeric resins, especially where good flame-retardance and high thermal stability are desired.

The following examples will further illustrate the process of the present invention and compounds obtained thereby.

*Example 1.—Preparation of Dimethyl-Diisocyanatosilane*

A 200 milliliter, three-neck flask equipped with a stirrer, reflux condenser fitted with a drying tube, thermowell, dropping funnel and external cooling bath was charged with 33 grams (0.256 mole) of dimethyldichlorosilane, 44.5 grams of dimethylacetamide (0.512 mole) and 100 milliliters of benzene. Liquid isocyanic acid, 22 grams (0.512 mole) at −70° C., was added slowly over nine minutes keeping the pot temperature between 22 and 31° C. Filtration separated the theoretical amount of solid dimethylacetamide hydrochloride. The filtrate was fractionated at atmospheric pressure and there was obtained a 70.2 percent yield of dimethyl-diisocyanatosilane based on isocyanic acid charged. It boiled at 134°–136° C. and had a refractive index of 1.4205 at 25° C.

*Example 2.—Preparation of Diethoxy-Diisocyanatosilane*

A 500 milliliter flask equipped as in Example 1 was charged with 68.8 grams (0.364 mole) of diethoxydichlorosilane, 57.1 grams (0.660 mole) of dimethylacetamide and 130 milliliters of benzene and the mixture was maintained at 29° C. Liquid isocyanic acid, 28.5 grams (0.662 mole) at −75° C., was then slowly added over a period of 15 minutes during which time the temperature of the reaction mixture rose to 47° C. By additional cooling the temperature was maintained at 30° C. for an additional 30 minutes. The solid dimethylacetamide hydrochloride was separated from the reaction mixture by filtration and washed with 100 milliliters of benzene. The filtrate was fractionated at atmospheric pressure and there was obtained an 80.8 percent yield of diethoxy-diisocyanatosilane based on isocyanic acid charged. It boiled at 171° C. and had a refractive index of 1.3988 at 30° C.

*Example 3.—Preparation of Diphenoxy-Diisocyanatosilane*

In a manner after Example 2, 49.6 grams (0.173 mole) of diphenoxydichlorosilane was reacted with 13.4 grams (0.312 mole) of liquid isocyanic acid. The product, diphenoxy-diisocyanatosilane, was obtained in good yield.

*Example 4.—Preparation of Diphenyl-Diisocyanatosilane*

A 200 milliliter flask equipped as in Example 1 was charged with 30.4 grams (0.120 mole) of dichlorodiphenylsilane and 41.8 grams (0.481 mole) of dimethylacetamide. Liquid isocyanic acid, 15.5 grams (0.361 mole), was added dropwise to the warm mixture over a period of 25 minutes during which time the temperature rose from 60° C. to 83° C. The mixture was then heated at 100° to 120° C. for one hour. The material was cooled and the resulting slurry fractionated. Diphenyl-diisocyanatosilane was obtained in good yield. It boiled at 137° C. at a pressure of 3 millimeters of mercury and its refractive index at 25° C. was 1.5723.

*Example 5.—Preparation of Tetraisocyanatosilane*

A 200 milliliter flask equipped as in Example 1 was charged with 30.2 grams of silicon tetrachloride (0.178 mole), 62 grams of dimethylacetamide (0.712 mole) and 100 milliliters of benzene. Liquid isocyanic acid, 30.6 grams (0.712 mole), was added dropwise over 22 minutes. When the third drop of isocyanic acid was added a white solid appeared. The temperature rose from 26 to 67° C. during the addition. The resulting slurry was cooled and filtered. A substantially quantitative amount of dimethylacetamide hydrochloride was obtained (64 grams). The filtrate was fractionated after stripping the benzene and tetraisocyanatosilane was obtained in good yield. It boiled at 61° C. at a pressure of 2 millimeters of mercury and its refractive index at 26.5° C. was 1.4590.

*Example 6.—Preparation of Di-n-Butyl-Diisocyanatosilane*

A 200 milliliter flask equipped as in Example 1 was charged with 44.5 grams of di-n-butyl-dichlorosilane (0.209 mole), 36.4 grams of dimethylacetamide (0.418 mole) and 100 milliliters of benzene. The isocyanic acid, 18.0 grams (0.418 mole), was added dropwise over 22 minutes, during which time the temperature rose from 27° C. to 59° C. After filtration, in which the theoretical amount of amide salt was obtained, the filtrate was distilled. The product, di-n-butyl-diisocyanatosilane, fractionated at 96° C. at a pressure of 3 millimeters of mercury and was obtained in good yield. Its refractive index at 25° C. was 1.4428.

*Example 7.—Preparation of Dimethyl-Diisocyanatosilane*

A 500 milliliter flask equipped as in Example 1 was charged with 24 grams (0.186 mole) of dimethyldichlorosilane and 50 milliliters of diethyl ether. After chilling the ether and silane to about −70° C., 16 grams (0.372 mole) of isocyanic acid was slowly added thereto. Thereafter, 63.2 grams (0.372 mole) of diphenylamine in 200 milliliters of diethyl ether was added to the flask over a 15 minute period during which time the temperature rose to −40° C. and solids appeared. Upon warming to room temperature additional diphenylamine hydrochloride precipitated. All of the latter was filtered off and it amounted to almost the stoichiometric quantity. The product, dimethyl-diisocyanatosilane, was recovered as in Example 5.

*Example 8.—Preparation of Phenyl-Triisocyanatosilane*

The following substances were placed in the apparatus described in Example 1:

|  | Grams | Moles |
| --- | --- | --- |
| Phenyltrichlorosilane | 41 | 0.194 |
| Dimethylaniline | 64.5 | 0.581 |
| Benzene | 132 |  |

After beginning the stirring, 25 grams (0.581 mole) of liquid isocyanic acid was added to the reaction flask over a ten minute period. Although the flask was cooled, the temperature of the reaction mixture rose from 19 to 39° C. during the addition period. Immediately thereafter, the dimethylaniline hydrochloride was filtered off. The hydrochloride was washed with benzene and the liquor combined with the filtrate. On concentration of the filtrate, additional dimethylaniline hydrochloride precipitated and was removed as above. The filtrate was fractionated to give phenyl-triisocyanatosilane in good yield. The boiling point was 111° C. at 3.5 millimeters of mercury and the refractive index at 26° C. was 1.5180.

*Example 9.—Preparation of Dimethyl-Diisocyanatosilane*

The cyanuric acid pyrolyser was charged with 50 grams (0.39 mole) of cyanuric acid and the discharge end of its postheater was connected to a 500 milliliter flask equipped as in Example 1. The flask was charged with 52.5 grams (0.407 mole) of dimethyldichlorosilane, 70.9 grams (0.814 mole) of dimethylacetamide and 300 milliliters of anhydrous ether. Isocyanic acid generated in the pyrolyser was fed directly into the flask which was maintained at a temperature of −70 to −47° C. When the pyrolysis of the cyanuric acid was complete, the reaction mixture was diluted with additional ether and filtered under a positive nitrogen pressure through a fritted glass filter. The filter cake, dimethylacetamide hydrochloride, was washed several times with ether and the filtrate stripped of volatiles. The filtrate was fractionated and dimethyl-diisocyanatosilane was obtained in good yield.

*Example 10.—Preparation of Tetraisocyanatosilane*

Example 9 was repeated except that the isocyanic acid vapor was absorbed in a solution of silicon tetrachloride (43.6 grams) and 200 milliliters of anhydrous ether prior to introduction into the reaction mixture. The product, tetraisocyanatosilane, was obtained in good yield.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of silicon isocyanates having the structural formula:

$$R_y Si(NCO)_z$$

wherein each R is independently selected from the group consisting of a monovalent hydrocarbon radical, a monovalent alkoxy radical, and a monovalent aryloxy radical; $y$ is an integer from 0 to 3, inclusive; $z$ is an integer from 1 to 4, inclusive; and the sum of $y$ plus $z$ equals 4, which comprises: reacting together in the liquid phase, at a temperature of between −85 and 150° C., isocyanic acid and a silicon halide having the structural formula:

$$R_y SiX_z$$

wherein X is halogen and R, $y$, and $z$ are as defined above, in the presence of a nitrogen-containing compound selected from the group consisting of compounds having the following structural formulas and mixtures thereof:

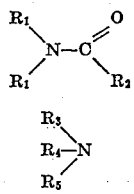

wherein each $R_1$ is independently a monovalent hydrocarbon radical, and $R_2$ is selected from the group consisting of a monovalent hydrocarbon radical and hydrogen, and each $R_3$, $R_4$ and $R_5$ is independently selected from the group consisting of a monovalent hydrocarbon radical and hydrogen, at least one, but not more than two, of $R_3$, $R_4$ and $R_5$ being a monovalent aromatic radical, and not more than one of $R_3$, $R_4$ and $R_5$ being hydrogen, and recovering the resultant product.

2. A process according to claim 1 wherein said nitrogen-containing compound is slowly added to a mixture of said isocyanic acid and silicon halide.

3. A process according to claim 1 wherein said isocyanic acid is slowly added to a mixture of said silicon halide and nitrogen-containing compound.

4. A process according to claim 3 wherein liquid isocyanic acid is introduced into the reaction mixture.

5. A process according to claim 3 wherein gaseous isocyanic acid is introduced into the reaction mixture.

6. A process according to claim 3 wherein gaseous isocyanic acid is absorbed in a silicon tetrahalide prior to addition to the reaction mixture.

7. A process according to claim 1 wherein the reaction is conducted in the presence of an inert solvent.

8. A process according to claim 1 wherein said nitrogen-containing compound is dimethylacetamide.

9. A process according to claim 1 wherein said nitrogen-containing compound is diphenylamine.

10. A process according to claim 1 wherein said nitrogen-containing compound is dimethylaniline.

11. A process according to claim 1 wherein diphenyldiisocyanatosilane is recovered as product of the process.

12. A process according to claim 1 wherein chloro-triisocyanatosilane is recovered as product of the process.

13. A process according to claim 1 wherein di-(n-butyl)-diisocyanatosilane is recovered as product of the process.

14. A process according to claim 1 wherein dimethyldiisocyanatosilane is recovered as product of the process.

15. A process according to claim 1 wherein phenyl-triisocyanatosilane is recovered as product of the process.

References Cited in the file of this patent

UNITED STATES PATENTS 2,876,209     De Benneville et al. _____ Mar. 3, 1959

OTHER REFERENCES

Anderson: Jour. Am. Chem. Soc., volume 72 (1950), pages 193–4.

Goubeau et al.: "Berichte," volume 93 (1960), pages 1, 111–6.

Rodziewicz et al.: "Roczniki Chemii," volume 33 (1959), pages 579–86.